(No Model.)
E. L. HEIDENREICH.
CAR BRAKE AND STARTER.
No. 321,218. Patented June 30, 1885.
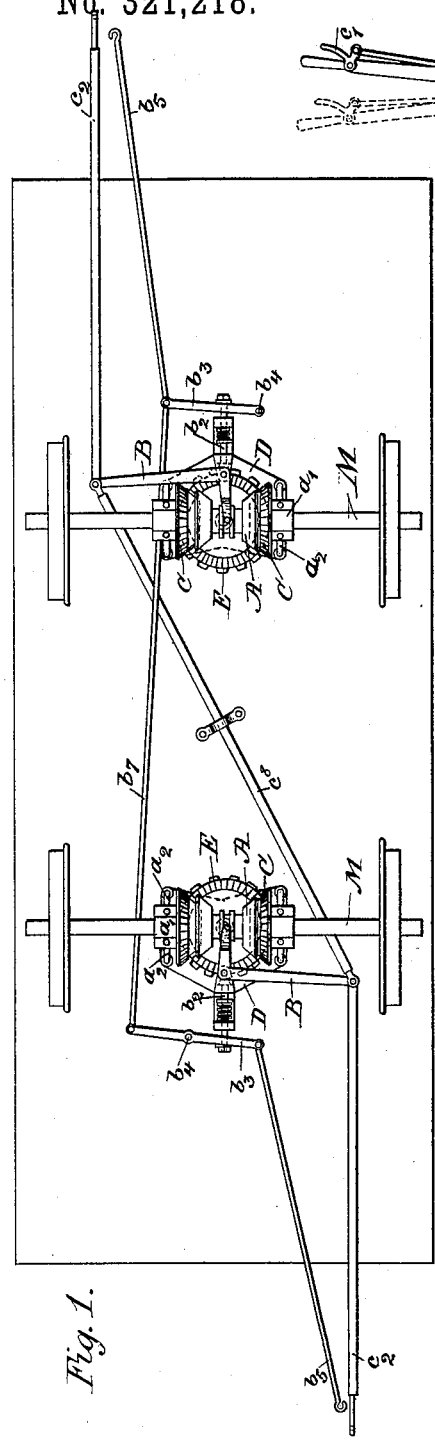
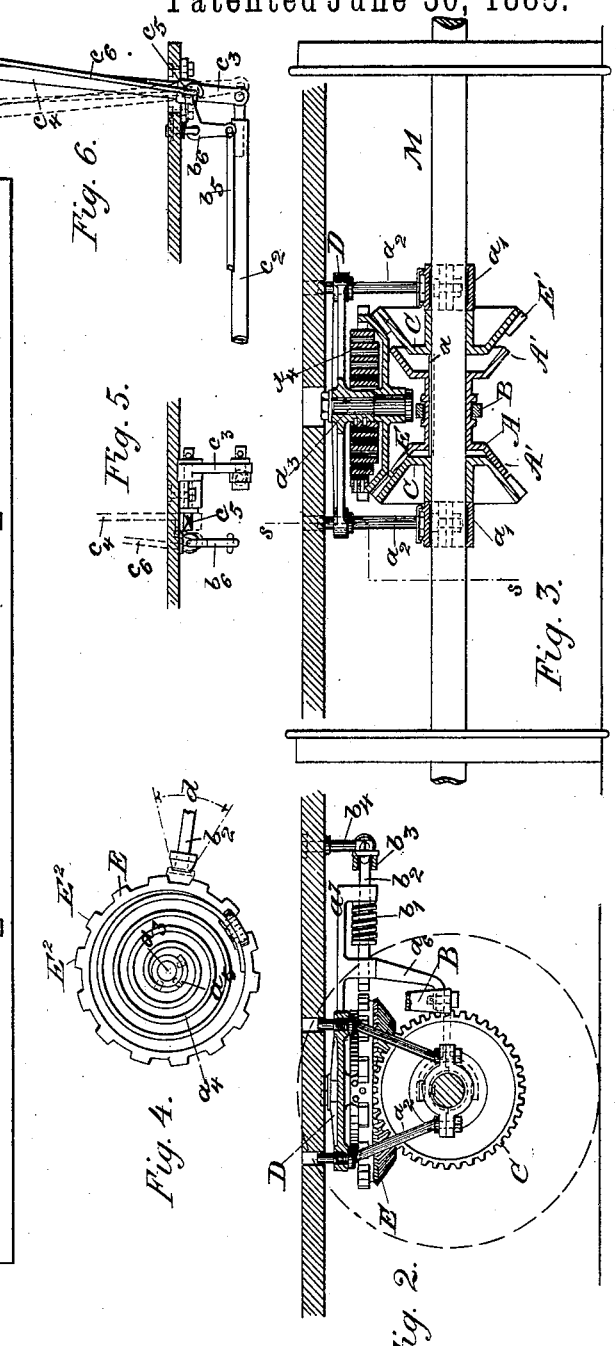
WITNESSES
C. Sedgwick
Edgar Tate
INVENTOR
Eyvind Lee Heidenreich
By Munn & Co.
Attorneys

UNITED STATES PATENT OFFICE.

EYVIND LEE HEIDENREICH, OF CHICAGO, ILLINOIS, ASSIGNOR OF ONE-HALF TO JOHN A. McLENNAN, OF SAME PLACE.

CAR BRAKE AND STARTER.

SPECIFICATION forming part of Letters Patent No. 321,218, dated June 30, 1885.

Application filed April 17, 1885. (No model.)

*To all whom it may concern:*

Be it known that I, EYVIND LEE HEIDENREICH, a resident of Chicago, in the county of Cook and State of Illinois, have invented a new and Improved Car Brake and Starter, of which the following is a full, clear, and exact description.

This invention relates to certain new and useful improvements in car brakes and starters, in which the energy of the car is stored in a spring when the car is to be stopped, which stored energy is utilized when the car is to be started.

The object of my invention is to simplify the construction of the car brake and starter and to make the same more effective in use.

The invention consists in the combination, with an axle, of a sliding sleeve arranged to turn with the axle and having clutch-cups at its ends which can be engaged with clutches mounted loosely on the axle and engaging with a wheel in which a spiral spring is coiled.

The invention also consists in parts and details and combinations of the same, as will be fully set forth and described hereinafter.

Reference is to be had to the accompanying drawings, forming a part of this specification, in which similar letters of reference indicate corresponding parts in all the figures.

Figure 1 is a plan view of the under side of a car provided with my improved car brake and starter. Fig. 2 is an enlarged cross-sectional elevation of the same on the line $s\ s$, Fig. 3. Fig. 3 is a longitudinal sectional elevation of the same at the middle of the axle. Fig. 4 is a top view of the socket-wheel containing the spring. Fig. 5 is a section through the platform, showing the manner of attaching the hand-lever. Fig. 6 is a side view of the hand-lever.

On the axle M the sliding sleeve A is mounted, which is guided by a spline or key, $a$, to slide on the axle and revolve with the said axle. On the ends of the sleeve A the female friction-clutch cups A' are formed to fit against the male clutch-cups C, loosely mounted on the axles between the ends of the splines and the bearings $a'$. Each sleeve A is provided with an annular groove for receiving the forked end of an angle-lever, B, pivoted on the lower end of a bracket, $a^6$, projecting from a frame, D, supported by four (more or less) bolts, $a^2$, projecting upward from the bearings, the upper ends of the said bolts being passed into apertures in the car-floor, in which apertures they play loosely. On the outer parts of the beveled surfaces of the male clutch-cups C teeth E' are arranged, which form bevel cog-wheels, which bevel cog-wheels engage at their tops with diametrically-opposite points of a cup-shaped bevel cog-wheel, E, mounted on a bolt, $a^3$, held in the middle of the frame D, and projecting downward. In the said cup-shaped wheel E a spring, $a^4$, is coiled, which has one end secured firmly to the socket $a^5$ surrounding the bolt $a^3$, and the other end secured to the inner surface of the cup-shaped wheel. The said spring must be made more or less powerful, according to the weight of the car. On the rim of the wheel E laterally-projecting teeth $E^2$ are formed, which teeth are preferably made of steel. A sliding bolt, $b^2$, is arranged in a bracket, $a^7$, projecting from the frame D, and the said bolt is provided with a head adapted to engage with the spaces between the teeth $E^2$. The bolt $b^2$ is surrounded by a spring, $b'$, held between arms of the bracket $a^7$, which spring presses the end or head of the bolt against the toothed edge of the wheel E. The bolt $b^2$ is connected with a lever, $b^3$, pivoted by a bolt or pin, $b^4$, on the bottom of the car.

In case one of the above-described devices is used on each axle, the ends of the levers B are connected by a connecting-rod, $c^3$, on the under side of the car, and the levers $b^3$ are connected by a connecting-rod, $b^7$. Each lever $b^3$ is connected with a rod, $b^5$, and each lever B is connected with a rod, $c^2$. The rod $c^2$ is connected with the lower end of a lever, $c^4$, which is pivoted in the car-floor in such a manner that it can easily be detached and applied on the other end of the car. I have shown the said lever provided with a square eye, through which a square pin, arranged to turn on the car-floor, can be passed; but, if desired, the said lever can be arranged in any other suitable manner. An angle-lever, $b^6$, is pivoted to the car and has its lower end connected with a rod, $b^5$. On the other end of the said lever $b^6$ a hook is formed, which is passed into an eye in the lower end of the rod $c^6$, connected with an angle-lever, $c'$, pivoted on the lever $c^4$ near its upper end.

The operation is as follows: To stop the car, the lever $c^4$ at the front of the car is thrown in such a manner as to press one female clutch-cup $A'$ firmly against the adjacent clutch-cup C, so as to lock them firmly together, whereby the said clutch-cup C is locked on the axle and revolves the wheel E, whereby the spring $a^4$ is coiled and drawn up very tightly. The energy of the car is consumed and taken up in coiling the spring, and thus the car is brought to a standstill. At the same time that the lever $c^4$ is thrown the angle-lever $c'$ is pressed toward the opposite end of the lever $c^4$ for the purpose of withdrawing the bolt $b^2$ to permit the wheel E to be revolved. As soon as the spring has been coiled and the car brought to a standstill, the angle-lever $c'$ is released, so as to permit the spring $b'$ to press the end of the bolt $b^2$ against the toothed rim of the wheel E, thus locking the same in place.

To start the car, the lever $c^4$ is thrown in such a manner as to engage the other female clutch-cup $A'$ with the other clutch-cup C by friction, and then the angle-lever $c'$ is pulled for the purpose of withdrawing the bolt $b^2$ from the wheel E, whereby the said wheel is released and the spring $a^4$ permitted to uncoil. The spring revolves the axle E, which in turn revolves the said cup C, and by means of the sleeve A the axle and the wheels thereon are revolved. The car is thus started.

The operation is always the same whether the apparatus is provided on one or on two axles, and the apparatus can be worked from the front or rear end of the car, as may be desired.

The above-described device can be used on cars of all kinds—such as steam railway-cars, horse-cars, cable-road cars, or even on ordinary vehicles.

I do not limit myself to the exact construction, arrangement, and combination of parts and details, as it is evident that the same can be arranged in various different ways without departing from the spirit of my invention.

I do not confine myself to guide the bolts $a^2$ merely by means of the apertures in the car-floor. Some parallel link-motion will probably be more efficient. The head of sliding bolt $b^2$ is beveled, so as to give sufficient and yet not too much resistance in being pulled out, the angle $d$ being determined by the weight of the car.

Having thus described my invention, I claim as new and desire to secure by Letters Patent—

1. In a car brake and starter, the combination, with an axle, of a clutching device arranged to slide on and revolve with the axle, a clutching device mounted loosely on the axle and provided with cogs upon its outer flared surface and with clutch-teeth at the base of said cogs which are engaged by corresponding teeth of the aforesaid clutching device, a cog-wheel engaging with the cogs on the said clutching device, a spiral spring secured at one end to the said cog-wheel, and having its other end secured to a fixed part, and of levers for engaging the sliding clutching devices with the clutching devices mounted loosely on the axle, substantially as herein shown and described.

2. In a car brake and starter, the combination, with a car-axle, of a sleeve mounted to slide on and turn with the axle and having clutch-cups at its ends, of two clutch-cups mounted loosely on the axle adjacent to the ends of the above-mentioned sleeve, cogs formed on the clutch on the axle, said latter clutch also having clutch-teeth at the base of the cogs, with which engage the clutch-cups of the said above-mentioned sleeve, a cog-wheel engaging with the said clutches on the axle, a spring having one end secured to the said cog-wheel and the other end to a fixed part, and a lever for shifting the sleeve to engage the clutching devices on one end of the sleeve with the adjacent clutch on the axle, substantially as herein shown and described.

3. In a car brake and starter, the combination, with the axle, of the sleeve A, having the clutch-cups $A'$ on the ends, the clutches C, mounted loosely on the axle and having teeth $E'$ upon their outer flared surfaces, and clutch-teeth at the base of said teeth $E'$, with which clutch-teeth engage the clutch-cups $A'$, the cog-wheel E, engaging with the teeth $E'$ of the clutches C C, and having teeth on its rim, the spring $a^4$, coiled in the wheel E, and levers and rods for shifting the clutch-sleeve and operating the bolt, substantially as herein shown and described.

4. In a car brake and starter, the combination, with the axle, of the sleeve A, having the clutch-cups $A'$ on the ends, the clutches C, mounted loosely on the axle and having teeth $E'$, the cog-wheel E, engaging with the teeth $E'$ of the clutches C C, and having teeth on its rim, the spring $a^4$, coiled in the wheel E, the sliding bolt $b^2$, the spring $b'$, acting on the same, the lever $b^3$, connected with the bolt, the rod $b^5$, and the rod $c^2$, for shifting the sleeve A, substantially as herein shown and described.

5. In a car brake and starter, the combination, with the axle, of the sleeve A, having the clutch-cups $A'$ on the ends, the clutches C, mounted loosely on the axle and having teeth $E'$, the cog-wheel E, engaging with the teeth $E'$ of the clutches C C, and having teeth on its rim, the spring $a^4$, coiled in the wheel E, the sliding bolt $b^2$, held in a bracket, $a^7$, the spring $b'$, the lever $b^3$, the lever B, for shifting the sleeve A, the rod $c^2$, connected with the lever B, the rod $b^5$, connected with the lever $b^3$, the lever $c^4$, connected with the rod $c^2$, the angle-lever $b^6$, connected with the lever $b^5$, the rod $c^6$, and the elbow-lever $c'$ on the lever $c^4$, substantially as herein shown and described.

6. In a car-brake and starter, the combination, with the axles, of the sliding sleeves A on the same, provided with clutch-cups A', the clutches C on the axles having teeth, the cog-wheels E, the springs $a^4$, the levers B, connected by a rod, $c^3$, the sliding bolts $b^2$, the levers $b^3$, the rod $b^7$, connecting the levers $b^3$, the rods $c^2$ and $b^5$, the lever $c^4$, the elbow-lever $b^6$, and rods for connecting the lever $c^4$ and elbow-lever $b^6$, substantially as herein shown and described.

EYVIND LEE HEIDENREICH.

Witnesses:
ELBRIDGE HANECY,
GEORGE P. MERRICK.